United States Patent [19]

Philipps et al.

[11] 3,778,774

[45] Dec. 11, 1973

[54] RECORDER CONTROL SYSTEM

[75] Inventors: Louis E. Philipps, Addison; Eugene A. Stanis, Wheeling, both of Ill.

[73] Assignee: Medelco, Incorporated, Wood Dale, Ill.

[22] Filed: Mar. 8, 1971

[21] Appl. No.: 121,919

Related U.S. Application Data

[62] Division of Ser. No. 761,043, Sept. 20, 1968, Pat. No. 3,597,742.

[52] U.S. Cl. .......... 340/172.5, 340/174.1
[51] Int. Cl. .......... G06f 3/00
[58] Field of Search .......... 340/172.5, 174.1 H

[56] References Cited

UNITED STATES PATENTS

| | | | |
|---|---|---|---|
| 3,480,931 | 11/1969 | Geissler | 340/172.5 X |
| 3,491,341 | 1/1970 | Alaimo | 340/172.5 |
| 3,454,930 | 7/1969 | Schoeneman | 340/172.5 |
| 3,268,870 | 8/1966 | Chalker | 340/172.5 |
| 3,512,139 | 5/1970 | Reynolds | 340/172.5 |
| 3,587,056 | 6/1971 | Banziger | 340/172.5 |
| 3,633,177 | 1/1972 | Caldwell | 340/172.5 |
| 3,037,194 | 5/1962 | Dirks | 340/172.5 |
| 3,281,527 | 10/1966 | Davis | 340/172.5 X |
| 3,293,613 | 12/1966 | Gabor | 340/172.5 |
| 3,302,180 | 1/1967 | Donohoe | 340/172.5 |

*Primary Examiner*—Paul J. Henon
*Assistant Examiner*—John P. Vandenburg
*Attorney*—Mason, Kolehmainen, Rathburn & Wyss

[57] ABSTRACT

A hospital data handling system transmits and receives the message information normally required in hospital operations and automatically withdraws from the transmitted messages all data necessary for establishing such items as bed status data, inventory records, patient charges, etc. The system input is derived from permanent punch cards containing message and control information and disposable punch cards containing variable data, such as patient identifying cards made, for instance, when a patient is admitted. A printer and a card reader are located at each message originating location or station in the hospital to provide messages which are placed in a delay line input storage shared by a group of card readers. As the delay line data is transferred to a core storage unit shared by all the readers, a printer selector checks each message for printer addresses, and a control decoder checks for the type of operation to be performed on the message. If only output recording is required and if all addressed printers are available, the message is cleared from the delay line storage and read out from the core storage unit to the printers through buffer track message blocks on a drum in a central processor. A printer control automatically moves from block to block as each message is printed and automatically adds a printer start and a printer stop to the beginning and end, respectively, of the transmitted data.

11 Claims, 15 Drawing Figures

Inventors:
Louis E. Philipps
Eugene A. Stanis
By: Mason, Kolehmainen,
Rathburn & Wyss;
ATTORNEYS.

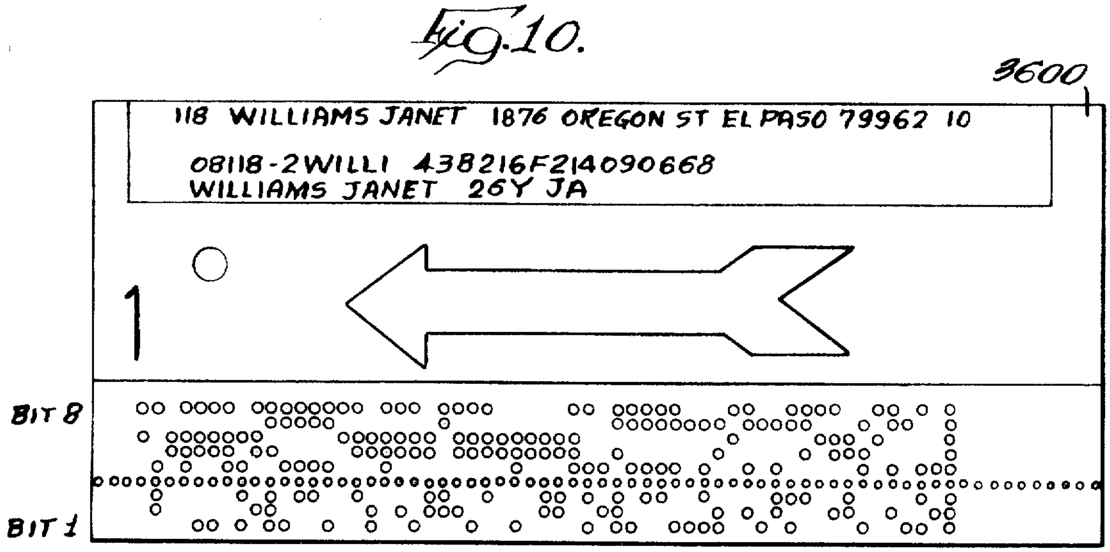
Fig. 10.
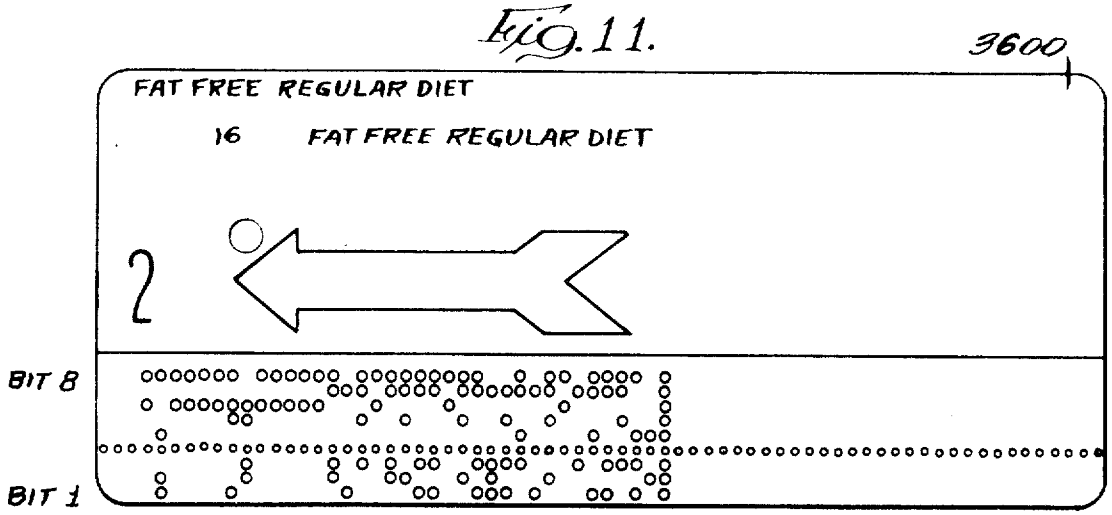
Fig. 11.
08 118-2 WILLI 438216 F 214 0906 68
WILLIAMS JANET 26Y JA
FAT FREE REGULAR DIET
054 9/ 6/68 10:45 PM
Fig. 12.

RECORDER CONTROL SYSTEM

This application is a division of a copending application Ser. No. 761,043, filed Sept. 20, 1968 now U.S. Pat. No. 3,597,742. The central data processor unit used with the system of this invention is disclosed in a copending application Ser. No. 761,042, filed Sept. 20, 1968, and now abandoned, which application is assigned to the same assignee as the present application.

This invention relates to a data handling and processing system and, more particularly, to a system for automatically collecting and recording data such as data relating to hospital operations.

The operation of a hospital with even a small number of beds involves the preparation and transmission of a very large number of rather short messages relating to virtually every phase of hospital operation ranging from pharmacy orders, requests for laboratory tests, and admitting or discharging instructions to requests for repair of a broken window. In some hospitals, a written order is made only when the nature of the service demands it, and other functions such as maintenance or bed status are requested by oral communication. Further, many of the operations or items covered by the messages require a charge to be made frequently against several entities, e.g., inventory and a patient. These charges are collected either by using the primary written message or by making secondary records frequently in machine code based on a primary message.

However, the use of written orders and messages is time consuming, requires manual transmission or conveyance to perhaps a number of points of use, and is subject to error in preparation when read and translated to secondary records. The compilation and calculation of charges or inventory records require the physical presence of all of the records, and it has been determined that errors arise not only from record loss but from charges entered for serves requested that are not actually performed. The time involved in collecting and translating the records and messages frequently causes a delayed billing for charges not available on discharge and delays the submission of charges to other paying bodies such as insurance companies. Further, because of the time required by written messages, there is a temptation to use oral requests when the nature of the requested service or item does not demand a written record.

The data handling and processing system of the present invention does away with written messages and orders and insures the collection, calculation, and compilation of all charges on any desired periodic basis. Messages and charges are free of transmission errors and provide legible permanent copy for medical records. In addition, skilled hospital personnel are freed from time consuming clerical duties and from acting as messengers with the resultant increase in their availability for professional services.

In general, the system includes a central processing unit which receives data from and supplies data to a plurality of remote stations each located at a point from which messages or orders are normally received and to which this data is normally directed. Each remote station includes a data recorder such as a teleprinter and a data transmitter. The data transmitter comprises a card or record reader which is enabled for operation by the insertion and actuation of a key identifying the station operator such as a technician or nurse and which is adapted to send plural card messages to selected points. Each station includes prepared cards containing all of the message information normally required by the department and other cards individually identifying each patient. By inserting the cards forming a plural card message into the reader, the patient and requested service information is automatically transmitted to one or more points in the hospital as required for each service or message, and any data relating to charges or other data compilations is collected in storage in the central processing unit. During message transmission from the card or record reader, a digital signature identifying the key that enabled the card reader is automatically transmitted to identify the person responsible for originating the message.

The basic system organization includes a plurality of card readers, groups of which time-share different delay lines providing input buffers. The delay lines are scanned for complete messages to enable transfer of a complete message to a magnetic core storage unit. The data in core storage is then either transferred to a magnetic drum storage unit, or is transmitted to one or more of the remote stations, or both, depending upon the nature of the received information and the functions required to be performed on the data designated by control characters on each card. If the message requires nothing more than transmission to one or a group of stations, the data is transferred from the core storage unit to tracks on the drum which function as an output buffer, and then is delivered over output lines to the addressed stations. The system continuously monitors the transfer of data to the addressed stations and automatically shifts from one output buffer location to the next containing data for the same addressed stations whenever absence of data from a block is detected. The recorder output circuitry also includes means for automatically adding recorder control signals to messages sent for buffer storage to addressed recorders.

Many other objects and advantages of the present invention will become apparent from considering the following detailed description in conjunction with the drawings in which:

FIGS. 1–3 form a block diagram of the data handling and processing system embodying the present invention;

FIGS. 4–8 disclose a logic schematic form a control circuit for supplying data to a storage drum and for transferring data from the drum to an output recorder;

FIGS. 10 and 11 are illustrations of cards used to provide a data input to the system;

FIG. 12 is an illustration of a typical record produced by the system;

FIG. 13 is a block diagram illustrating the manner in which FIG. 14 is a block diagram illustrating the manner in which FIGS. 4-8 are placed adjacent each other to form a complete circuit diagram.

Figure 1:
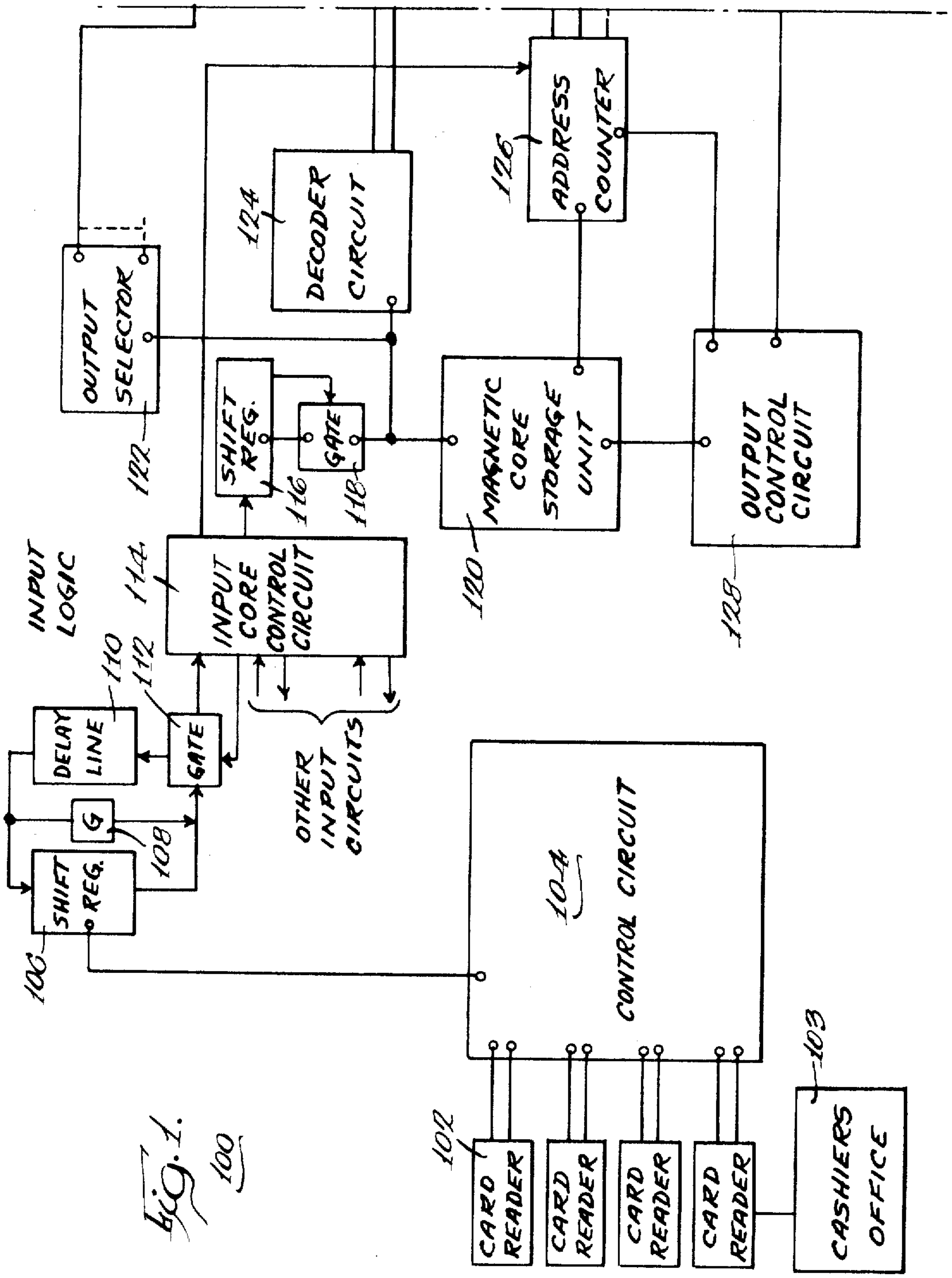
FIGS. 1–3 are placed adjacent each other to form a complete circuit diagram.
Figure 2:
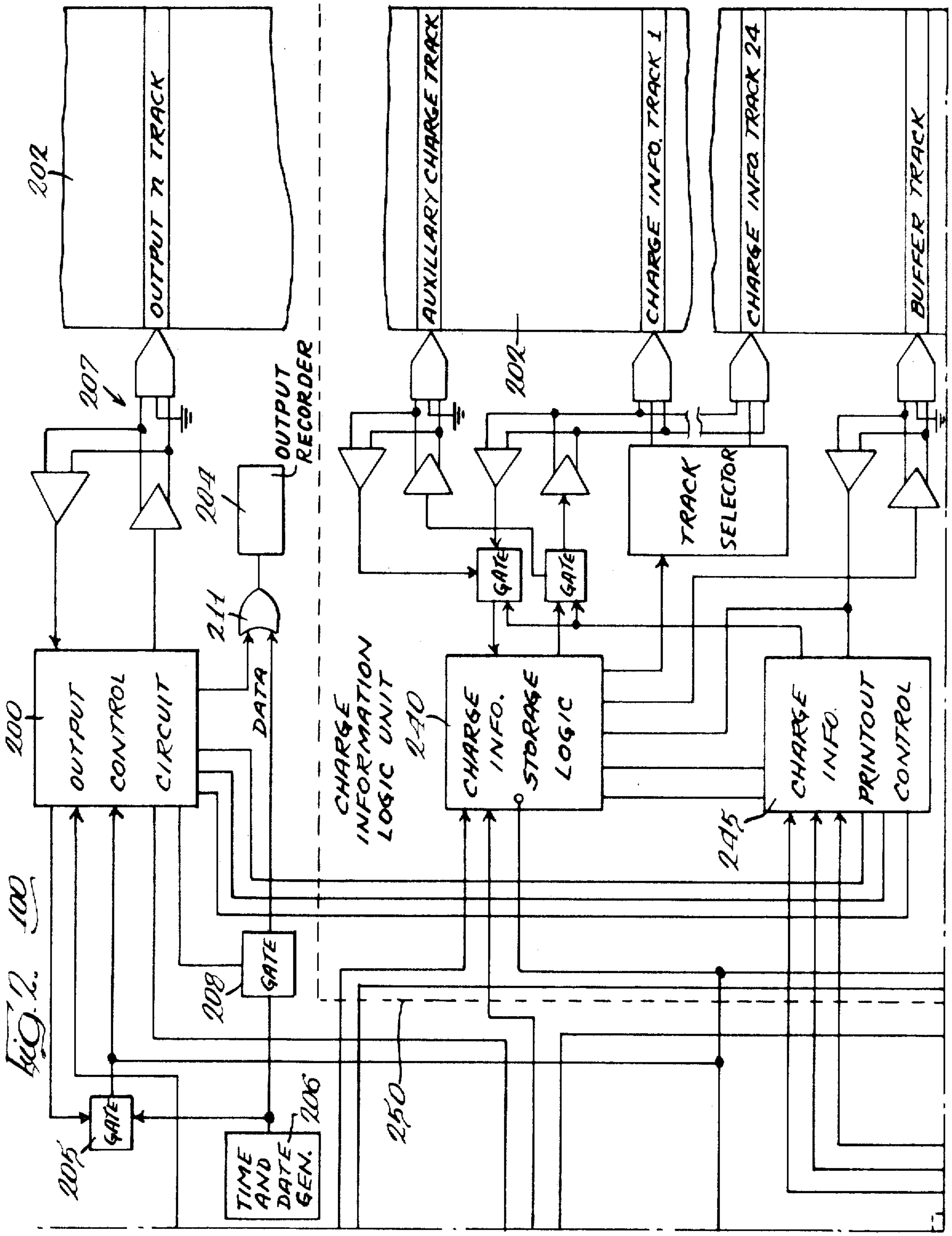
Figure 3:
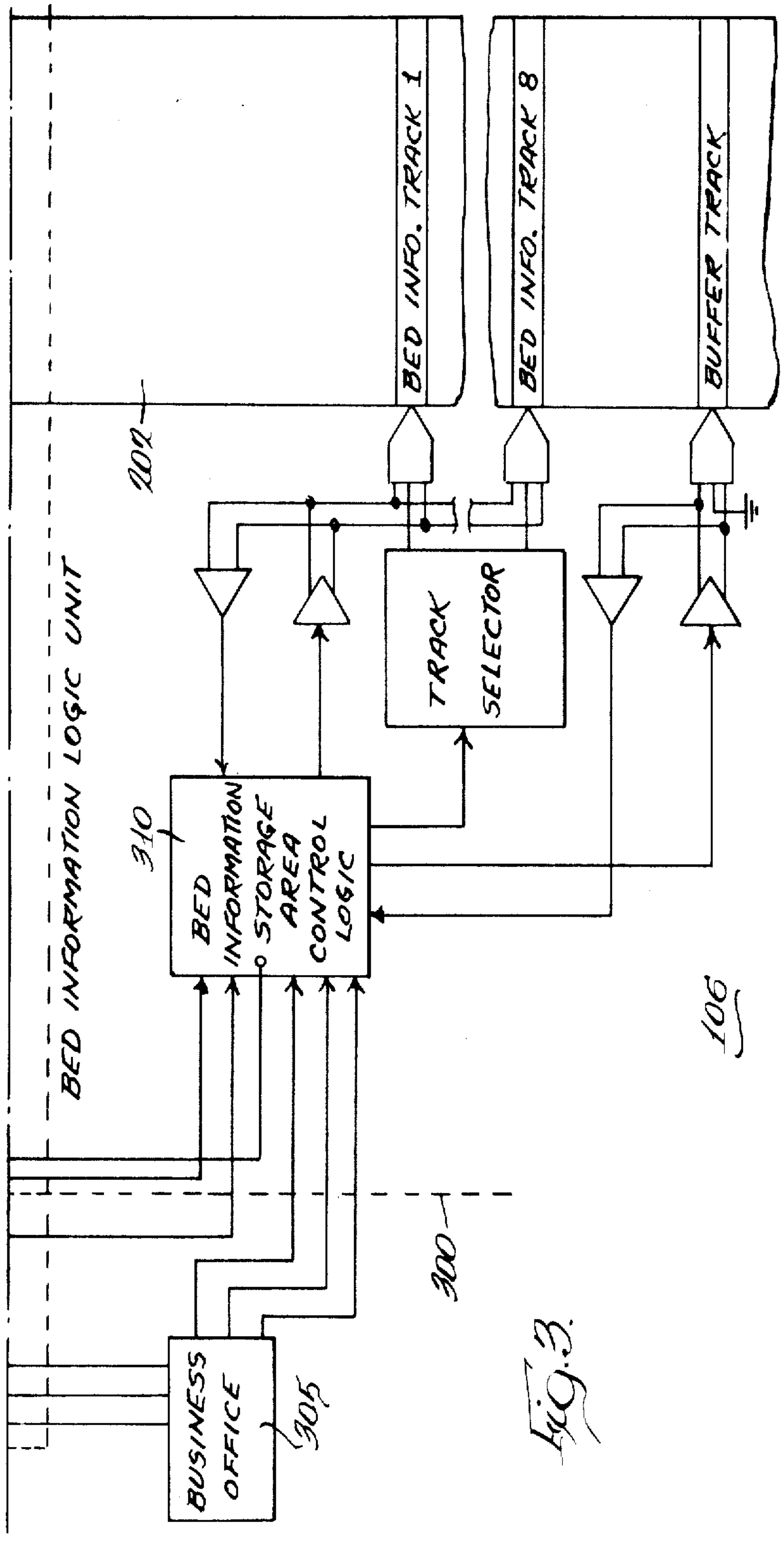
Figure 4:
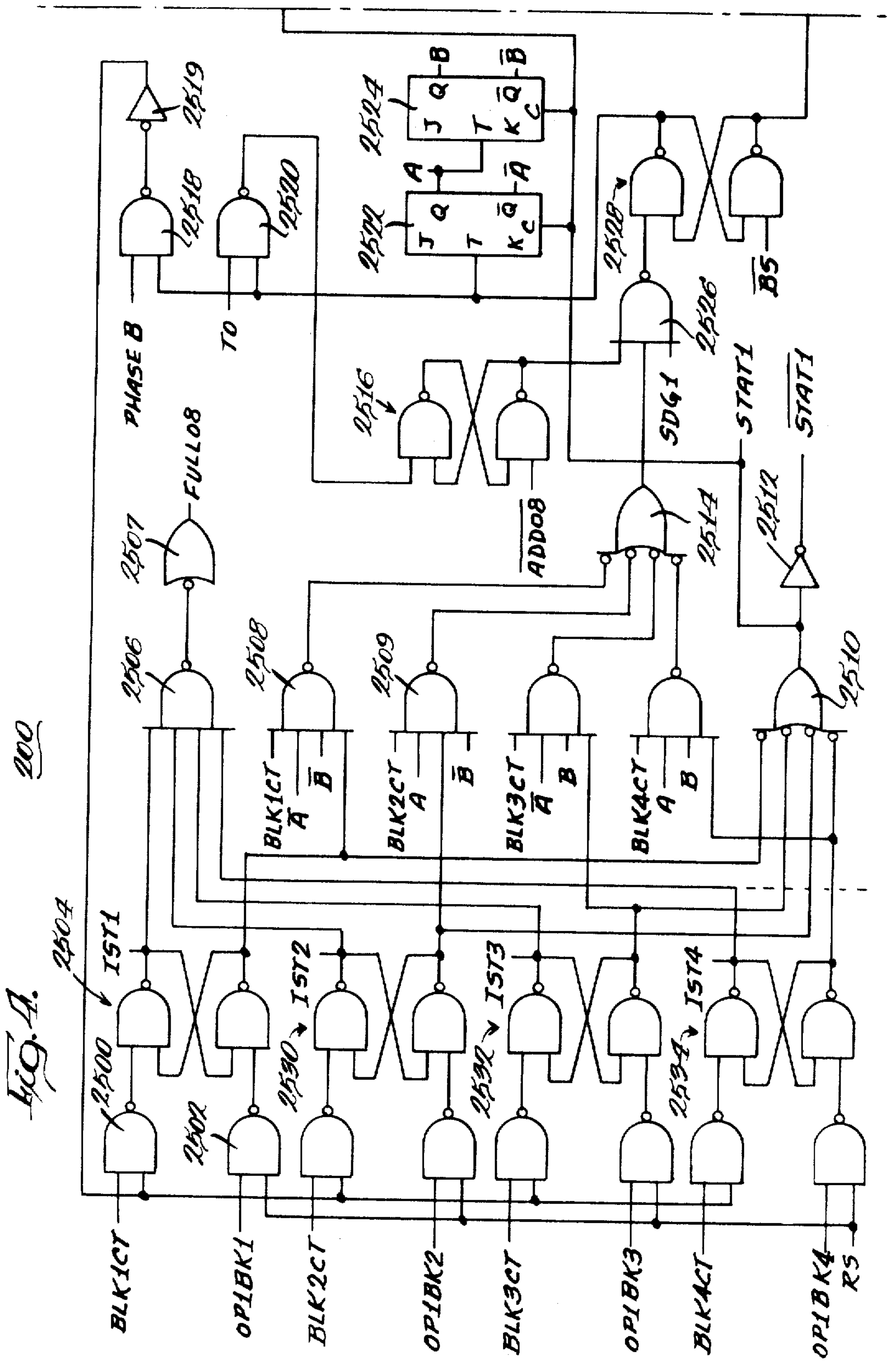

Referring now more specifically to FIGS. 1–3 of the drawings, therein is disclosed a block diagram of a system 100 embodying the present invention. The system 100 is capable of transmitting and receiving all of the communications, orders, and requests normally handled in a hospital and of automatically compiling and computing all necessary data relating to patient charges and the status of the beds in the hospital, as well as providing a running inventory control. To insure against the presence of errors, virtually all input messages are made by selecting records in machine readable code from a prepared supply thereof containing all of the messages and service requests normally required in a hospital. The patient information is derived from records prepared in machine readable code on admittance to the hospital.

Normal entry to the system is obtained through a card reader 102 which is supplied with two or more punch cards or permanent records containing patient identifying information, message information, and one or more control codes. Each of the card readers 102 is enabled by the actuation of a key individual to the operator or the person responsible for transmitting the message into the system 100. The actuation of this key appends a plural digit identifying designation to the message transmitted from each reader. A group of card readers 102 share a common delay line 110 which provides a buffer storage unit to which access is obtained through a control circuit 104. The delay line 110 is divided into a number of time slots equal to the number of card readers 102 having access to the delay line. When message data is to be loaded into the delay line 110, the control circuit 104 selects one of the card readers 102 to which it has access and transfers the information character by character into the delay line 110.

Message data stored in the delay line 110 is normally circulated through the shift register 106 and a gate 112. However, when new message information is to be added to the delay line 110, a gate 108 is enabled to bypass the shift register 106. This time shifts the message information a single character position and permits the new message material in the shift register 106 to be added to the delay line 110.

After a complete message has been stored in one of the time slots in the delay line 110, the gate 112 is selectively enabled under the control of an input core control circuit 114 which is common to a number of delay lines 110 to transfer a complete message character by character to an input shift register 116. When a complete character has been transferred from the delay line 110 to the shift register 116, it is transferred through a gate 118 to the input of a magnetic core storage unit 120. The control circuit 114 controls an address counter 126 to place each character from the shift register 116 in a predetermined address location in the storage unit 120.

As each message is shifted through the register 116 into the magnetic core storage unit 120, an output selector 122 examines the incoming message for address codes and performs one or a plurality of output selection operations to select one or a group of output controls 200 each individual to a single output such as a recorder or teleprinter 204. Each of the output control circuits 200 has access to a plurality of buffer storage blocks on a track of a magnetic drum 202 forming a part of a central processor unit consisting essentially of a charge information logic unit 250 and a bed information logic unit 300. If at least one of the buffer storage areas on the drum 202 of an addressed output control circuit is available, the output recorder 204 is considered idle or not as busy, and the magnetic core storage unit 120 is permitted to receive the entire message, and this message is erased from the delay line 110. Alternatively, if any one of the output control circuits 200 selected by the output selector 122 does not have available buffer storage space, the message is not stored in the unit 120 because it cannot be immediately processed, and the message is retained in the delay line 110 without erasure.

The system 100 also includes a decoder circuit 124 which also monitors the data supplied by the shift register 116 to the magnetic core storage unit 120 in selected locations to detect and decode certain control codes that advise the system 100 of the nature of the operation to be performed on the incoming message information. The decoder circuit 124 supplies the decoded information to the charge information logic unit 250 and the bed information logic unit 300 to indicate the disposition to be made of the message information.

If the message indicates that no operations on the data are to be performed, and it is to be supplied to an output recorder 204, an output control circuit 128 controls the address counter 126 to select the desired information and transfers this information through the circuit 128 to the output control circuit 200 with the timing required to write this information onto the buffer track of the drum 202 through conventional drum reading and writing electronics indicated generally as 207. The control circuit 200 selects an idle buffer block on the track for receiving the message information. Incident to this transfer, the output control circuit 200 enables a gate 205 so that date and time information from a date and time generator 206 can be added to the message. Further, by controlling the addresses primed into the counter 126, the output control circuit 200 can control the makeup and content of the message placed in storage on the drum. When a complete message has been stored on the drum 202, the output control circuit 200 reads the data character by character from the buffer storage block with drum timing and supplies this data through an output gate 211 with the timing required by the recorder 204 to control the recorder to produce an output message.

If the message stored in the core storage unit 120 requires processing by the central process, this information is supplied through a charge information storage logic circuit 240 for storage on the tracks of the drum 202 assigned to the unit 250 or through a bed information storage logic circuit 310 for storage on the tracks of the drum 202 assigned to the unit 300. The patient charge and bed information is processed in the units 250 and 300 and transferred by a charge information printout control circuit 245 to the output control circuit 200 which is directly addressed by the circuit 245. This data does not go into buffer storage associated with the various control circuits 200, but is directly transferred to the output recorder. If desirable or necessary, the selected output control circuits 200 can enable the gate 208 to add data and time information to the message supplied from the units 250 and 300 under the control of the control circuits 245.

A cashier's office 103 and a business office 305 are equipped with specific inputs to the system 100 that may or may not be associated with a card reader 102. The business office 305 can initiate requests for totals of charges and control the erasure of information from the drum 202. The business office 305 can also initiate a search for the room location of a patient by admission data, or by code number, and inventory searches for all items received and distributed by a particular department.

The system 100 uses a set of synchronized timing signals to control feeding data into and out of the drum 202 and in suppling output signals to the printers 204. These signals are developed by standard components and circuits, and the circuitry for obtaining these signals is not illustrated or described.

Figure 9:
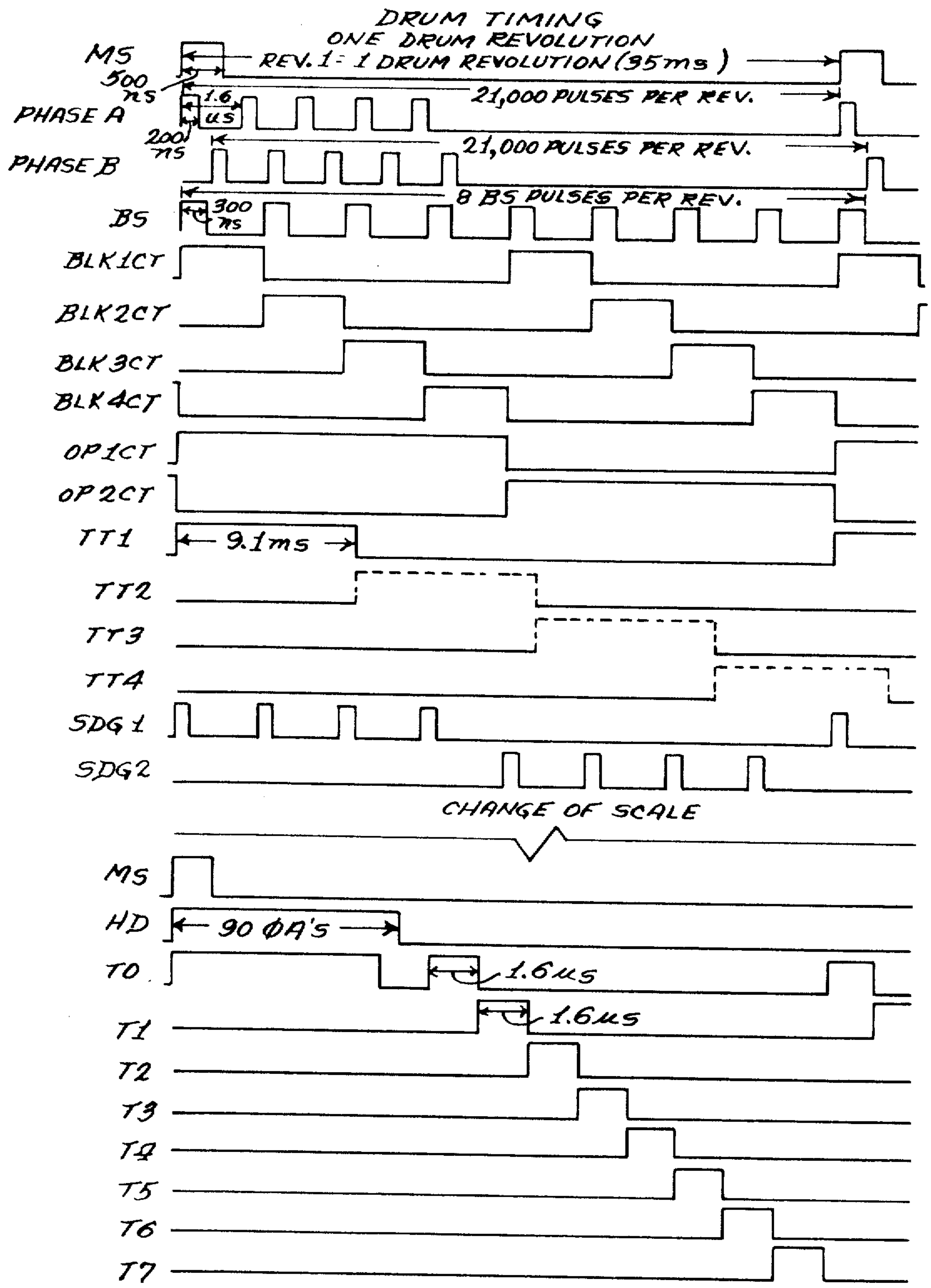
FIGS. 9 and 9A are timing diagrams of certain control and clock signals used in the system.
Figure 9A:
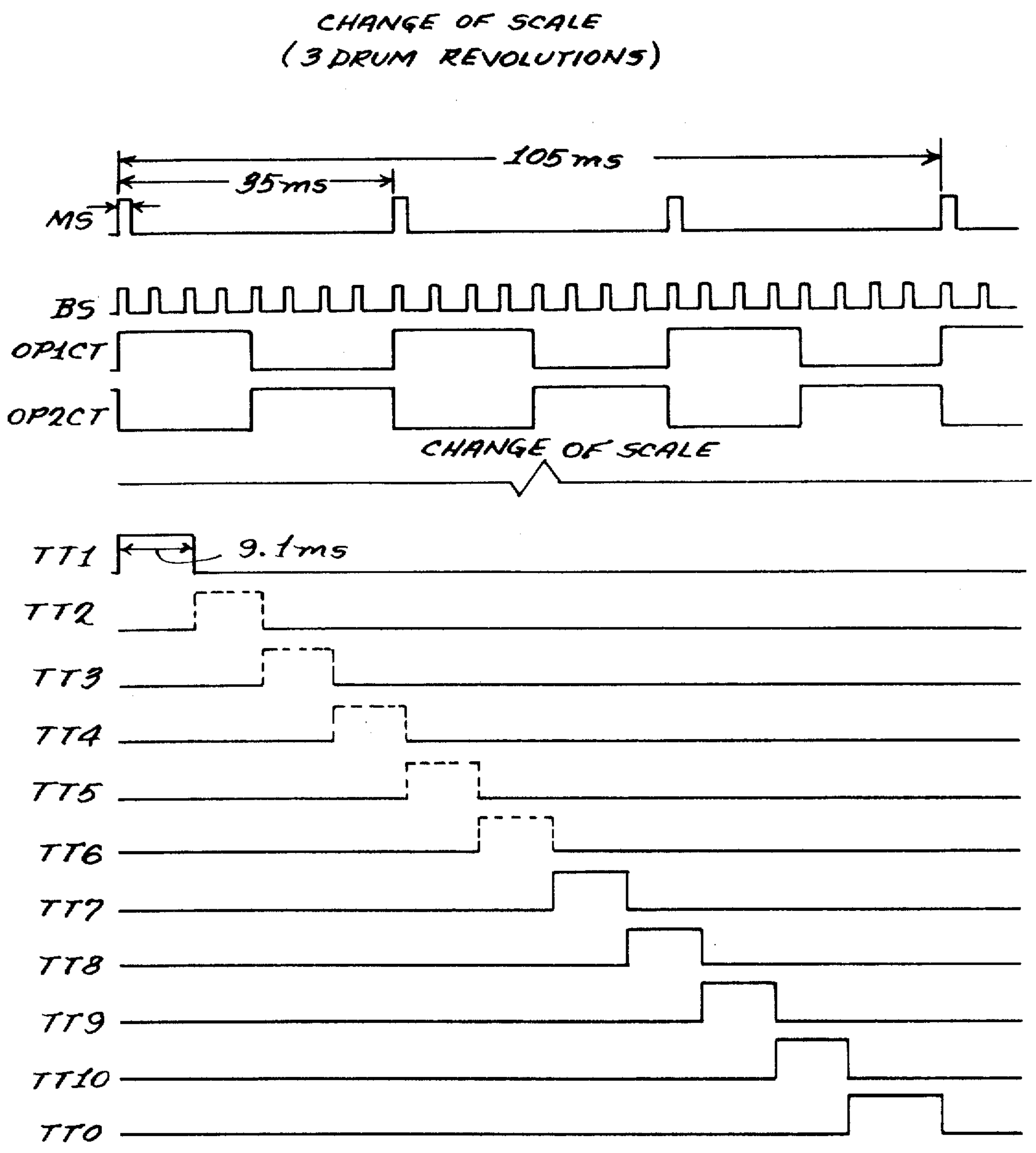

The drum or output timing waveforms are shown in FIGS. 9 and 9A of the drawings and are derived from a clock or timing track or a plurality thereof on the drum 202. The signal is shown on the first four lines of FIG. 9 of the duration and periodicity indicated thereon. The signals BS appear at the beginning of each block on a drum track. The next four signals BLK1CT, BLK2CT, BLK3CT, and BLK4CT define four blocks or segments on a track on the drum occurring twice during a drum revolution. When combined with the next two signals, i.e., OP1CT and OP2CT, these six signals effectively define eight separate blocks or segments on each drum track. The SDG1 and SDG2 signals are developed using the OP1CT, OP2CT signals and the signal BS during the second revolution of a three revolution drum cycle.

The timing signals T0–T7 are used for timing bit operations with respect to the drum and have a width of 1.6 us. with a repetition rate of 12.8 us. In the illustration, the initial positive-going portion of the T0 signal arises from the adjacent head delay signal HD and does not recur after the drum is placed in operation. The signals TT1 - TT10 and TT0 are of 9.1 ms. duration and are used to clock and control the output of signals to the output printer.

Two typical cards 3600 which can be applied to the card reader 102 to provide an input message to the system 100 are shown in FIGS. 10 and 11 of the drawings, and a typical or representative message provided at an output printer 204 from the two cards 3600 shown in FIGS. 10 and 11 is illustrated in FIG. 12. The insertion of the two cards 3600 into the card reader at nursing station "08" causes the message shown in FIG. 12 to be printed at the output printers at the originating nursing station which is assumed to be designated 08 and in the diet kitchen which is assumed to be designated as output 16.

In general, a message from a card reader can include two, three, or four cards containing no more than a total of 243 characters to which are added three characters from the key inserted in the card reader to identify the operator. Each of the cards in the message contains as a first significant character, a control character designating the type of operation or function to which the card or the message on the card relates.

To illustrate the operation of the system 100, it is assumed that the diet kitchen at output station 16 is to be achieved that Janet Williams, a patient in room 118, bed 2, located at nursing station 08 is to be provided with a fat-free regular diet. Since this involves only the transmission of information and does not affect charges or bed status, only two cards are necessary. FIG. 10 of the drawings illustrates a first card relating to the patient Janet Williams which is prepared on admission and is stored at nursing station 08. The top printed line of the card includes the patient's room number 118 followed by the patient's name, address, and miscellaneous information. This printed information facilitates the selection of the card for use in the reader. The second and third printed lines are a printed record of significant or selected portions of the information stored in coded form along the lower edge of the card.

More specifically, the second printed line includes the digits 08 identifying the nursing station involved, and the following digits 118–2 designate the patient occupies bed 2 in room 118. The following information "WILLI 438216" is the patient identification insofar as the data processing system is concerned. The next character "F" indicates that the patient is female. The next three characters "214" form a numerical designation of the attending physician. The remaining digits "090668" specify the month, day, and year of some reference date such as the date of admission.

With respect to the third printed line, this information is contained in the message portion of the card and comprises the full name of the patient and any additional information expressed in code such as the religious preference of the patient.

Referring now more specifically to the coded portion of the record shown in FIG. 10 contained along the lower edge thereof, these records are coded in ASCII code in which the lower line of perforations represents bit position 1 and the upper line of perforations represents bit position 8. Each card must begin with a space code consisting of perforations in the sixth and eighth bit levels, and the second character on each card is a control character. Since the card shown in FIG. 10 is designated as a control N card, perforations representing mark conditions are present in the second, third, and fourth bit positions. The eighth bit position is used to provide even parity, and thus a perforation is provided in the eight bit position for the control N character. The next twenty-nine characters comprise the information contained in the second printed line on the card including a space code between the "I" in "WILLI" and the "4" in the remainder of the line. Following these characters, a carriage return code and a line feed code are provided. The remaining characters are a coded representation of the third line of the printed message including the indicated spaces, and the message terminates with a carriage return, a line feed, an a code delete or "RUB OUT" code comprising perforations in all eight bit positions.

The second card of the illustrative message is designated a control K card which is illustrated in FIG. 11 The top printed line is provided to facilitate selection of the card containing the desired message, and a second printed line contains the station to which the message is to be directed together with the complete text of the message. In the coded positions appearing along the lower edge of the card, the first character comprises the required space code, and the second character comprises the required control character, in this case a control K. The next ten characters are provided to select up to five two digit stations. Since only one station is to be selected, space codes fill this area of the card except for the two characters providing a coded representation of the diet kitchen designation 16. The remainder of the card consists of the printed message shown in the second line of the card, and the card is terminated with a carriage return code, a line feed code, and a delete code.

The message produced by feeding the cards shown in FIGS. 10 and 11 into the system 100 is shown in FIG. 12. This message is produced at both the nursing station 08 at which the message originated and at the diet kitchen station 16. The first line of the printed message ithe second printed line of information from the card shown in FIG. 10 with spaces inserted by a format generator in the system 100. The second line of the printed message shown in FIG. 12 includes the information shown in the third printed line on the card illustrated in FIG. 10. The third line of the message includes data from the second printed line on the card shown in FIG. 11 with the station designation 16 omitted.

The last line of the message shown in FIG. 12 includes the numerical designation 054 which is appended to the message transmitted at the station 08 and which was derived from the key number of the nurse or other operator placing the message. The remaining portion of the fourth line of the message is generated by the data and time generator 206 in the system 100.

The details of the system 100 are represented by logic diagrams rather than by circuit diagrams. In physically constructing the system 100, any suitable family of logic elements can be used. An embodiment of the system has been constructed using TTL logic components, and the drawings illustrate circuits based on this form of logic implementation.

As described in detail in the parent application, the system 100 transfers message data from the reader 102 through the delay line 110 to the magnetic core storage unit 120. When a determination is made that message data is to be supplied to one or more of the output recorders, such as the output recorder 204 at the nursing station 08, the system 100 determines the idle-busy status of the requested recorder and initiates the transfer of message data out of, for example, the core storage unit 120. If the recorder 204 at the nursing station 08 is selected, the system 100 provides an inverted signal ADD08 representing the selection of this recorder by the selector 122. The control circuit 128 also supplies a signal DATA L which is a serialized message signal containing the bits of a number of message characters. The signal DATA L is repeated eight times corresponding to the eight message blocks on a single track of the magnetic drum 202.

In addition, when an output recorder, such as the recorder 204 is to be used as an output for the central processor, this process provides the output character in serial form as an inverted signal DATA X with recorder bit timing and provides an output demand in the form of an inverted signal INQ1. These signals are provided as described in detail in the above-identified copending application Ser. No. 761,042.

The control circuit 200 (FIGS. 4–8) takes the serialized core storage data in the form of the inverted signal DATA L and writes this data onto one of the four blocks in the buffer track on the drum 202 assigned to each of the output stations such as the station including the printer 204. When this data has been stored on the buffer track on the drum 202, the circuit 200 then initiates an output operation during which the data stored on any block containing a complete message is transferred off the drum 202, converted to telegraph signal timing, and forwarded to a selected output printer such as the printer 204. In addition, the control circuit 200 inserts certain control signals in the message information derived from the drum 202.

As set forth above, the output buffer tracks on the magnetic drum 202 are each effectively divided into two halves by the signals OP1CT and OP2CT, and each of these halves of the track is divided into four separate storage blocks each capable of storing a complete message by the timing signals BLK1CT-BLK4CT. FIGS. 4–7 of the drawings illustrate the portion of the control circuit 200 assigned to the data recorder 204 at the nurse's station identified as 08 to which are assigned four blocks in the first half of a given output buffer track defined by the signal OP1CT. A portion of the circuit illustrated in these Figures of the drawings is shared by a similar circuit to which are assigned the four blocks of buffer storage occupying the second half of the track defined by the timing signal OP2CT.

The circuit 200 includes for each of the output recorders a counting circuit such as a counting circuit including two flip-flops 2522 and 2524 which is in a setting representing an idle block on the assigned output track at any given time. Assuming that all four of the blocks available to output to the nursing station identified as 08 are empty, the counter including the flip-flops 2522 and 2524 is cleared to its normal setting in which the inverted output signals A and B of these flip-flops are at a more positive potential. A gate 2508 is partially enabled by the inverted input signals A and B. Further, if all of the blocks are empty, four status storage flip-flops 2504, 2530, 2532, and 2534 representing blocks, one, two, three, and four are all reset, and the third input to the gate 2508 is enabled.

When the nurse's station identified as "08" is addressed in the manner described in the parent application, an inverted signal ADD08 is applied to one input of a flip-flop 2516, and this flip-flop is set to partially enable a gate 2526. Anothe input to the gate 2526 is supplied by the signal SDG1. This signal is generated on FIG. 8 of the drawings by a gate 2920. One input of the gate 2920 is supplied with the signal OP2CT which defines the second block on the track through an inverter 2912. Thus, one input to the gate 2920 is enabled only during the first half of the track when the signal OP2CT is not present. The other input to the gate 2920 is supplied by a gate 2914 and an inverter 2916. The gate 2914 is enabled by the signals T7, REV2, and BLK CT ADV. As set forth in the parent application, the signal REV2 defines the second revolution of a three revolution cycle of the drum 202, and the signal BLK CT ADV appears for a short duration at the beginning of each of the eight blocks and is also used to advance the counter in the drum clock logic which provides the block defining signals BLK1CT-BLK4CT. Thus, with this timing, the inverted signal SDG1 is provided by the gate 2920, and a gate 2918 provides the same signal during the second half of the track.

Accordingly, the gate 2526 is enabled by the signal SDG1 at the beginning of each of the four blocks during the first half of the storage track assigned to the address 08. When the first block signal BLK1CT appears following the setting of the flip-flop 2516, the gate 2508 is fully enabled and is effective through a gate 2514 to complete the enabling of the gate 2526. The gate 2526 sets a flip-flop 2528 so that a more positive enabling potential is applied to two gates 2520 and 2518. When the PHASE B signal appears, the gate 2518 is fully enabled and is effective through an inverter 2519 to complete the enabling of a gate 2500, the other input of which is also supplied with the first block signal BLK1CT.

The enabling of the gate 2500 sets the flip-flop 2504 to generate the signal IST1. When the flip-flop 2504 is set, the gate 2508 is disabled to apply an inhibit to one input to the gate 2526. During the timing interval defined by the signal T0, the gate 2520 is fully enabled to rest the flip-flop 2516 and thus removes another enabling signal from the gate 2526.

The more positive output signal from the set flip-flop 2504 which indicates that the first block has been seized to receive a message enables one input to a gate 2506, the output of which is forwarded to a gate 2507. When all of the flip-flops 2504, 2530, 2532, and 2534 are set, thus indicating that all of the blocks available to output to the nursing station identified as 08 have been seized for use, the gate 2506 is fully enabled, and the gate 2507 developes the full or busy signal FULL08. The more negative signal provided by setting at least one of the flip-flops such as the flip-flop 2504 is also forwarded through a gate 2510 to provide the signal STAT1 which indicates that at least one message has been or is being stored in one of the blocks assigned to the station. The output from the gate 2510 is also forwarded to an inverter 2512 to provide the inverted signal STAT1.

When the bistable 2528 is set, the lower potential output from this flip-flop is forwarded through a gate 2630 to enable one input of a gate 2632. The other input of this gate is supplied with the signal DATA L which is the serialized data from the core storage unit 120. The output of the gate 2632 is coupled through an inverter 2634 to provide the signal DATA IP which is supplied to the head of the buffer storage track on the drum 202 assigned to the indicated station. The other input to the gate 2630 is supplied from the flip-flop similar to the flip-flop 2528 in the circuit assigned to the second half of the same storage track on the drum. The output of the gate 2630 also supplies a signal MWE which is used to enable the associated drum head.

At the beginning of the next block, an inverted block strobe signal BS is applied to the flip-flop 2528 to return this flip-flop to its rest condition. This removes the enabling potential for the gate 2632 and prevents any further writing of data onto the drum since it has been stored in the first block thereon. As set forth above, a singal DATA L includes the same message repeated eight times, but only one of these messages is transferred to the drum 202.

The resetting of the flip-flop 2528 also clocks the input flip-flop 2522 so that in the illustrative example the Q terminal of this flip-flop rises to a more positive potential. This removes the partial enabling from the gate 2508 and partially enables the gate 2509 assigned to the second block in the first half of the buffer drum track. Thus, the next message will be stored in the second block whenever the inverted address signal ADD08 next appears indicating the presence of a message in the core storage unit 120 for transmission to the output printer 204.

Figure 5:
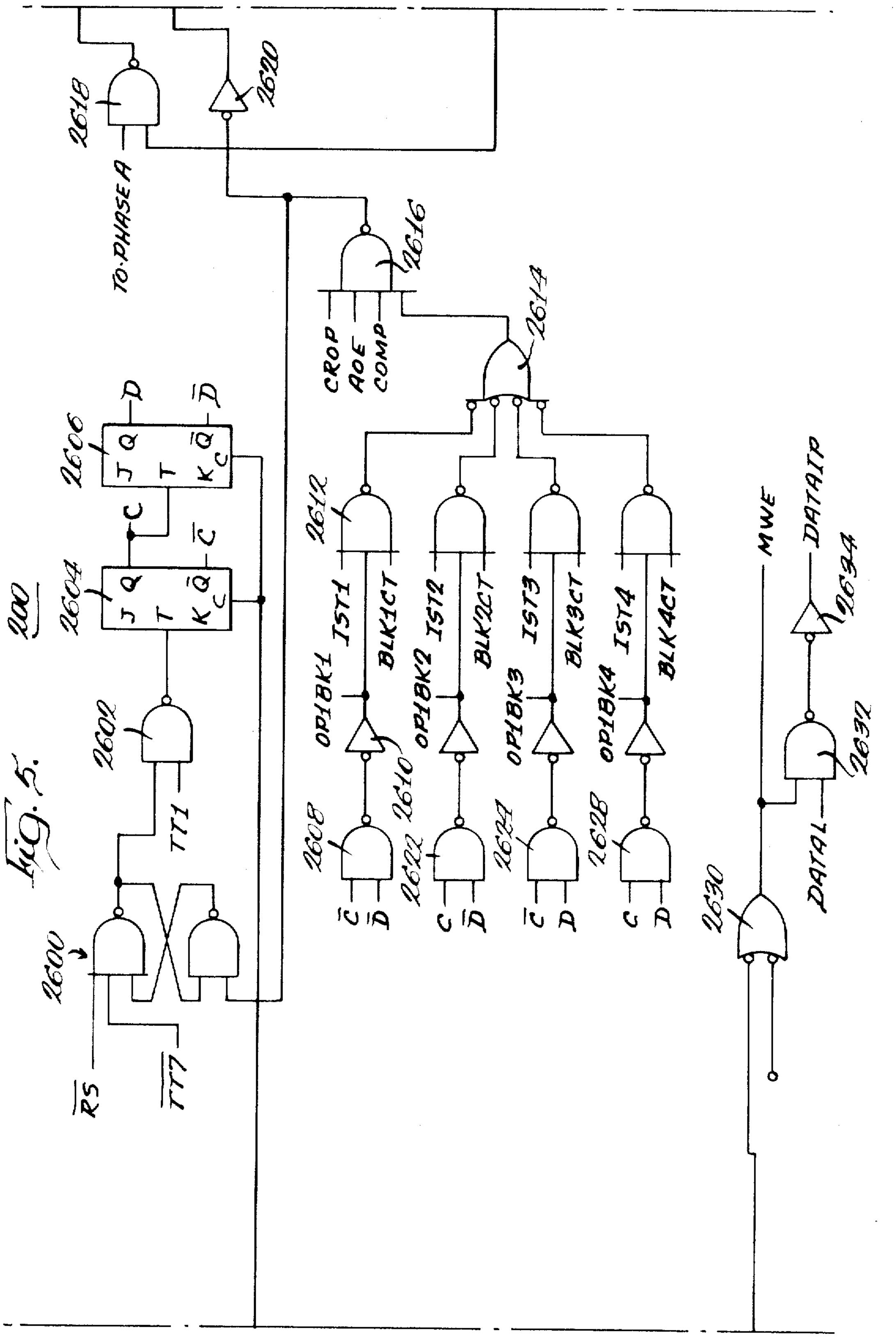
Figure 6:
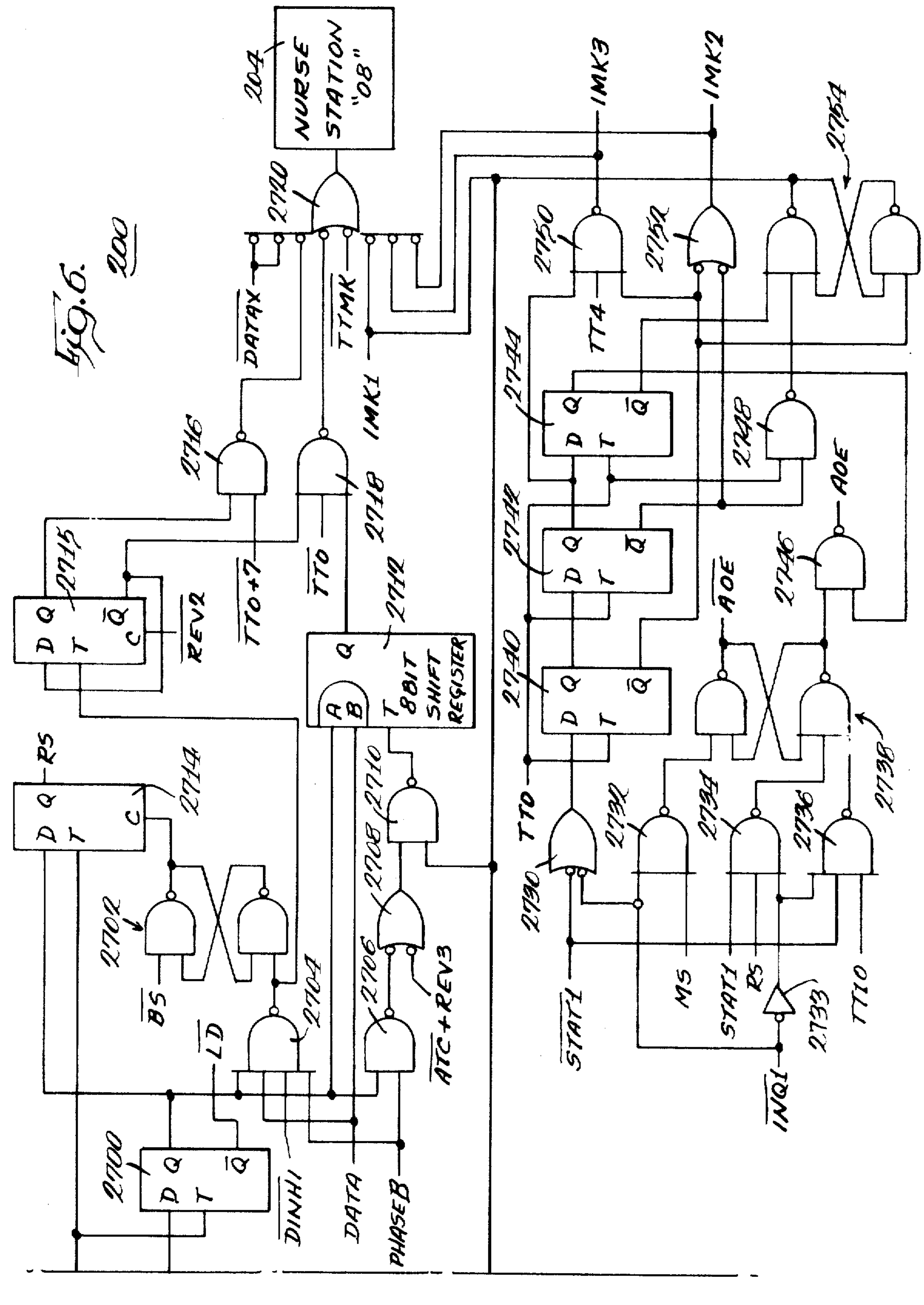
Figures 7, 13, 14:
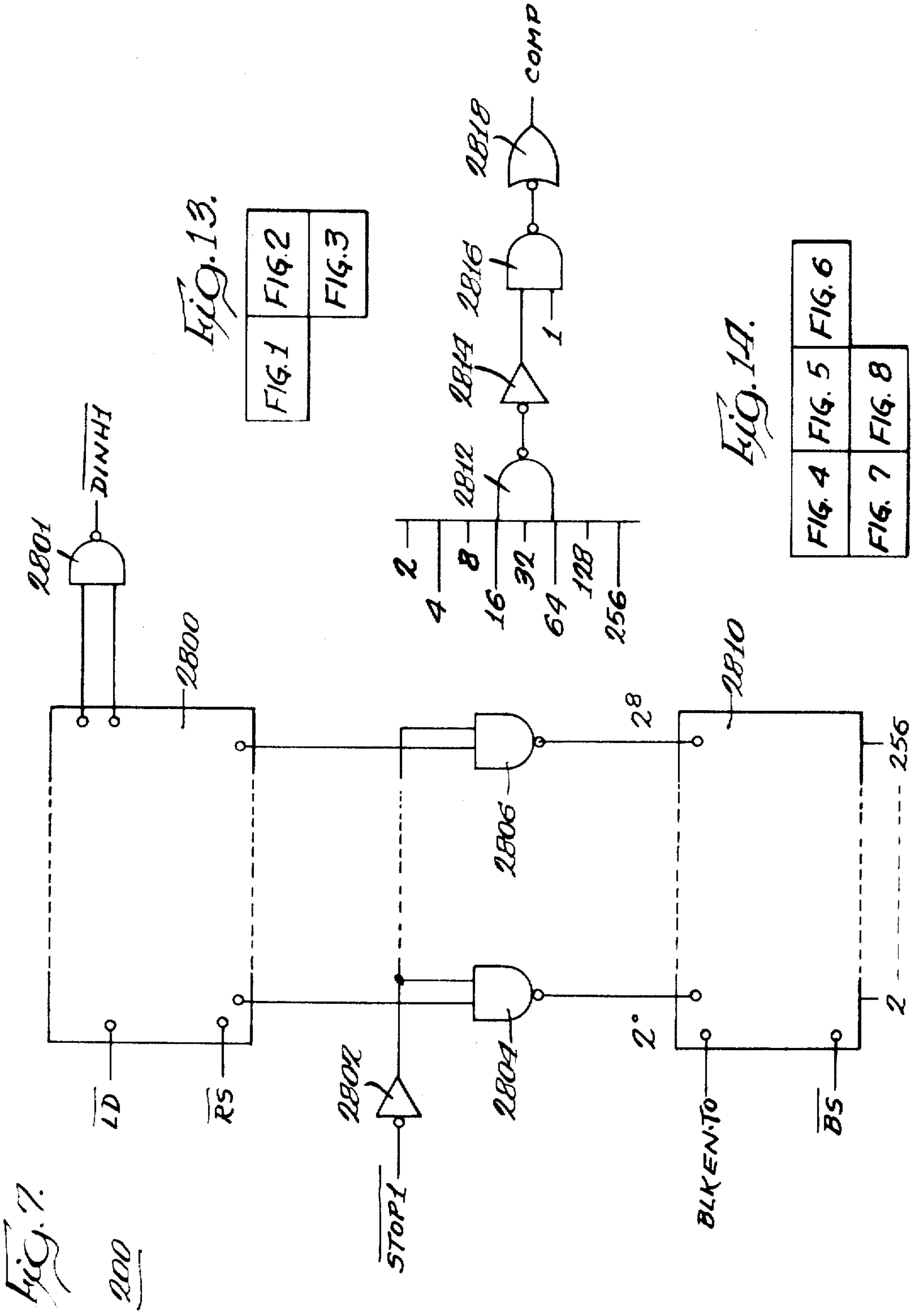
Figure 8:
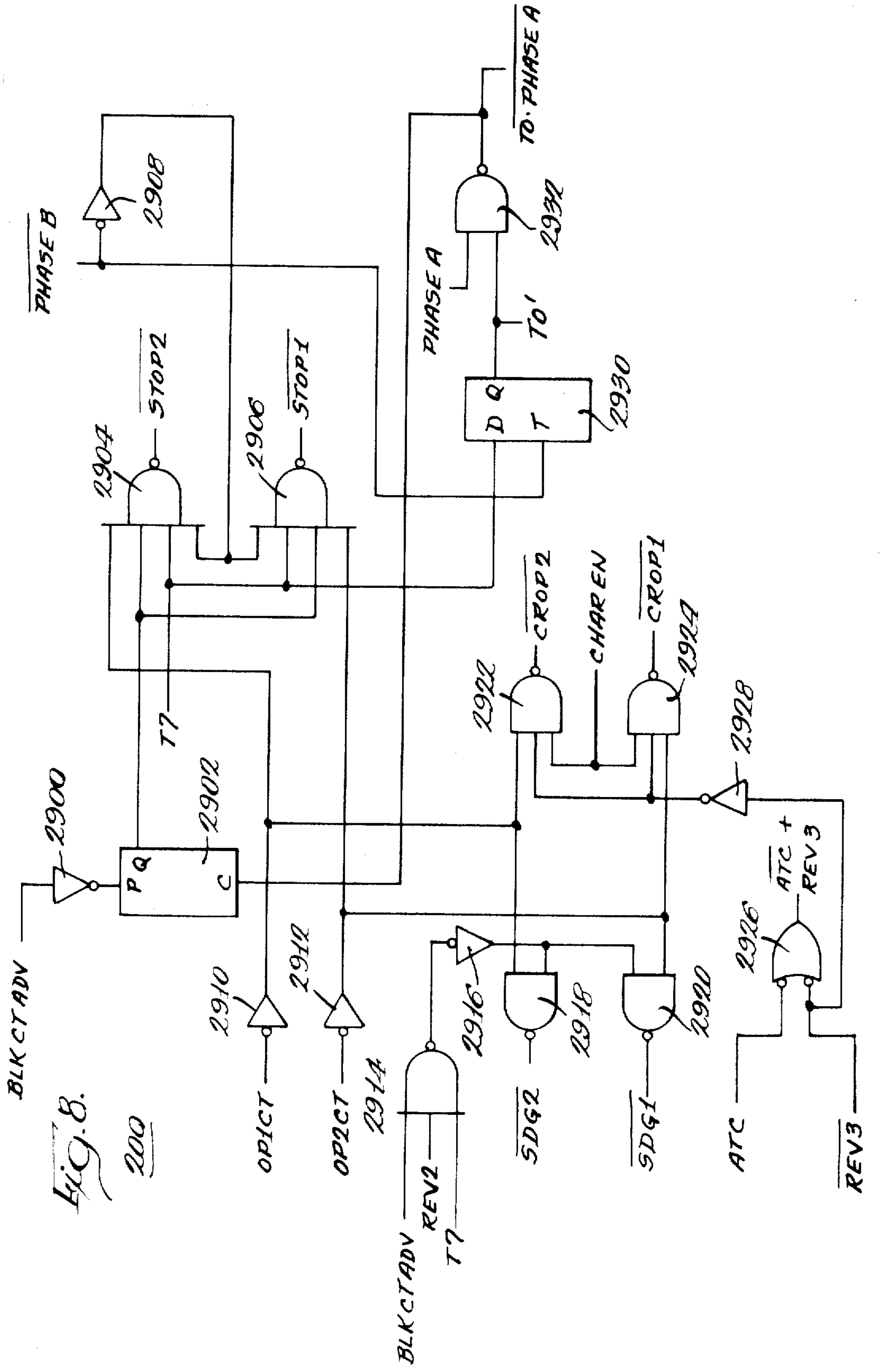

The circuit shown on FIGS. 5–7, of the drawings transfers the data derived from the drum 202 with drum bit timing to the output printer 204 with telegraph timing. The circuit 200 includes a counter including two flip-flops 2604 and 2606 which is advanced one step for each teletype character. More specifically, an input flip-flop 2600 is set by the inverted telegraph timing signal TT7 to partially enable a gate 2602. This gate is fully enabled by the telegraph timing signal TT1 to clock the input stage 2604. Thus, the counter including the stages 2604 and 2606 is advanced on each output character.

The Q and $\overline{Q}$ terminals of the flip-flops 2604 and 2606 are connected to the inputs of four gates 2608, 2622, 2624, and 2628 so that these gates are enabled in successive settings of the counter. When the gate 2608, for instance, is fully enabled, an inverter 2610 developes an output signal OP1BK1 and partially enables a gate 2612. The remaining inputs to the gate 2612 are provided by the signals BLK1CT and IST1. The presence of the signal IST1 indicates that a message has been stored in the first block which requires transfer to the printer 204. The signal BLK1CT times the gate 2612 to enable this gate during only the first block. When the gate 2612 is fully enabled, a more negative output from this gate is forwarded through the gate 2614 to enable one input to a gate 2616. The remaining inputs to the gate 2616 are provided by the inverted signal AOE and the signals COMP and CROP1.

Each time that the master strobe signal MS appears at the beginning of each drum revolution, a gate 2732 is enabled by the signal MS and the inverted signal INQ1. The low output from the gate 2732 sets a flip-flop 2738 to provide the inverted signal AOE. Thus, this signal also partially enables the gate 2616.

The signal CROP1 is developed by a gate 2924 having one input enabled during the first block on the drum or whenever the signal OP2CT is not supplied to the input of the inverter 2912. A second input to the gate 2924 is enabled by a character enabled signal CHAR EN developed by drum clock logic in the interval between the block strobe pulses or signals BS. The remaining input to the gate 2924 is enabled by an inverted signal REV3 applied to the input of an inverter 2928. The signal REV3 is generated during the third revolution of the three revolution cycle of the drum 202. When the gate 2924 is fully enabled, an inverted signal CROP1 is developed. A gate 2922 developes an inverted signal CROP2 with timing during the second half of the track. Thus, the signal CROP1 partial enables the gate 2616 during the third revolution of the drum after the disappearance of the block strobe signal BS. The last input to the gate 2616 provided by the signal COMP is enabled whenever the drum has been advanced to the location at which is located the next character to be supplied to the output printer 204.

The inverted signal STAT1 which is supplied through a gate 2730 to apply a more positive potential to the D input of the first of three D type flip-flops 2740, 2742, and 2744 causes the automatic generation of a sequence of signals for supplying a start code to the printer 204 to prepare this printer for receiving the following message or messages. Thus, when the leading edge of the signal TT0 is applied to the T terminal of the flip-flop 2740, this flip-flop is set to apply a more negative potential to one input of a gate 2752. The more positive potential at the output of the gate 2752 removes the continuous more negative potential previously supplied by the gate 2752 and thus changes the output of a gate 2720 from a continuous high level mark condition to a low level space condition. During the persistance of the signal TT0, both inputs to a gate 2749 are at a more positive potential, and the low output of this gate sets a flip-flop 2754 so that its upper gate provides a more positive signal for partially enabling two gates 2618 and 2710 and for supplying a signal 1MK1. When the flip-flop 2640 is set, the more negative potential provided at its $\overline{Q}$ output also drives the output of the lower gate in the flip-flop 2754 to a more positive potential. When the signal TT0 terminates, the gate 2748 is no longer fully enabled, and the signal from the $\overline{Q}$ terminal of the set flip-flop 2740 resets the flip-flop 2754 so that a more negative potential is provided at the output of the upper gate. This more negative potential holds the output of the gate 2720 at a high level or mark condition. Thus, the line to the printer 204 is supplied with a single space signal by the gate 2752 during the timing signal TT0 and is thereafter returned to a mark condition through the timing interval defined by the signals TT1-TT10 (See FIG. 9A).

At the leading edge of the next signal TT0, the flip-flop 2742 is set so that a more negative inhibiting signal is applied to one input of the gate 2749 and also to another input to the gate 2752. During the following output character timing interval, a gate 2750 is fully enabled by the signal TT4 in the fourth character position to apply a more negative signal to one input of the gate 2720. This, however, does not produce any change in the output inasmuch as the signal provided by the flip-flop 2754 maintains the line to the printer 204 in a continuous marking condition.

On the leading edge of the next following signal TT0, the flip-flop 2744 is set so that a more negative signal is supplied at its $\overline{Q}$ output terminal. This signal pulls the upper gate in the flip-flop 2754 to a condition in which a more positive signal is applied to the connected input of the gate 2720. The inputs to the gate are now all at a more positive potential, and the line to the printer 204 is in a continuous spacing condition. Thus, the application of any low level signal to the inut of the gate 2720 results in the transmission of a mark signal to the printer 204. Further, the high level signal provided at the output of the flip-flop 2754 provides an enabling signal for the gates 2618 and 2710 to enable data to be transferred to the printer 204.

The signal COMP which completes the enabling of the gate 2616 to read one character from the drum 202 to the recorder 204 is developed by the circuit shown on FIG. 7 and is provided when the position in the block containing the message to be transmitted is reached at which is stored the next character to be printed. More specifically, a counter circuit 2800 is provided containing a series of flip-flops which are advanced in normal binary counting progression under the control of an inverted signal LD supplied from the flip-flop 2700. The counter 2800 is reset by an inverted signal RS. In its reset condition, the counter 2800 provides a pattern of input signals to a series of transfer gates, two of which 2004 and 2006 are illustrated, representing the binary complement of the character to be transferred. This binary complement is easily derived by taking the output signals from the $\overline{Q}$ terminals of the flip-flops. As an example and assuming that the counter 2800 has been primed to a reset position representing that the first character is to be printed out, all of the outputs from the counter 2800 are at a more positive potential.

The circuit 200 includes a second counter 2810 including a plurality of flip-flops connected for normal binary counting progression under the control of an input signal BLKEN·TO'. This signal appears in the interval following the block strobe signal at a drum character timing rate. Thus, the counter 2810 is advanced a step for each character on the drum. The counter 2810 is reset once during each block by the inverted signal BS. The input from the counter 2800 is conveniently applied to the prime terminals of the individual flip-flops in the counter 2810 so that the conductive pattern set in the counter 2810 by the counter 2800 is the complement of the value stored in the counter 2800.

The transfer of the count from the counter 2800 into the counter 2810 is controlled by gates similar to the gates 2804 and 2806, one input of each of which is connected to the output of an inverter 2802. The input to the converter 2802 is supplied with an inverted signal $\overline{\text{STOP 1}}$. This signal is developed on FIG. 8 of the drawings. More specifically, this signal is developed by a gate 2906, one input of which is enabled by the inverted signal PHASE B through an inverter 2908. Another input to the gate is enabled by the signal T7, and a third input to the gate 2906 is enabled during the first half of the drum track by the signal OP2CT which is inverted by the inverter 2912. The remaining input to the gate 2906 is enabled from the Q terminal of a flip-flop 2902 which is set by the signal BLK CT ADV through an inverter 2900 at the beginning of each block. Thus, the inverted signal STOP 1 is effective through an inverter 2802 to prime the binary complement of the desired character stored in the counter 2800 into the counter 2810.

In the illustrative example, all of the stages of the counter 2810 are primed on because the counter 2800 is in this normal condition representing the desire for a first character, and all of the inputs to the gate 2812 are thus enabled. The complete enabling of the gate 2812 is effective through an inverter 2814 to partially enable a gate 2816, the other input of which is enabled by the signal 1. Thus, the gate 2816 is fully enabled to provide a signal output which is effective through a gate 2818 to provide the compare signal COMP.

When the signal COMP is provided, the gate 2616 is fully enabled, and the flip-flop 2600 is reset to inhibit advance of the counter including the flip-flops 2604 and 2606. Further, the more negative output from the gate 2616 is effective through an inverter 2620 to apply a more positive signal to the input of the flip-flop 2700. The flip-flop 2700 is closed through the gate 2618 by the signal TO·PHASE A. This signal is developed in FIG. 8 under the control of a flip-flop 2930 which is closed by the inverted signal PHASE B when the signal T7 is applied to the D input of the flip-flop 2930. The Q terminal of the flip-flop 2930 provides a signal TO' which is gated with the signal PHASE A in the gate 2932. The output of the gate 2932 provides an inverted signal TO·PHASE A. This signal also clears the flip-flop 2902 and thus removes the inverted signal STOP 1, as well as an inverted signal STOP 2 which is generated by a gate 2904 during the second half of the track.

When the flip-flop 2700 is closed by the output of the gate 2618, the Q terminal supplies a more positive potential and the $\overline{Q}$ terminal provides the inverted signal LD which advances the counter 2800 a single step to indicate that the second character is the next character to be supplied to the printer 204. A more positive potential at the Q terminal of the flip-flop 2700 partially enables a gate 2706, the other input of which is supplied with a signal PHASE B. Thus, the gate 2706 is fully enabled and is effective through a gate 2708 to complete the enabling of the gate 2710 to supply a negative-going clock pulse to the T terminal of the eight bit shift register 2712. The A input of the input gate to the register 2712 is enabled by the flip-flop 2700, and the B terminal of this gate is supplied with a signal DATA which is the data signal derived from the head of the drum. Thus, the first character stored in the selected block of the drum track is shifted into the shift register 2712 using the timing provided by the signal PHASE B.

At the end of the transmission of this angle character, the counter 2810 is advanced by the signal BLKEN·T0′, and the compare signal COMP is removed from the gate 2616. Thus, on the following signal T0·PHASE A, the flip-flop 2700 is clocked to terminate the inverted signal LD and to remove the enabling from the gate 2706 in the input to the shift register 2712. The more positive signal at the output of the gate 2616 also removes the resetting signal from the flip-flop 2600, but the character counter including the flip-flops 2604 and 2606 will now be advanced because of the long character time cycle for the output printer defined by the signals TT1-TT7 as compared with the time required for a three revolution cycle of the drum 202 (See FIG. 9A).

To read the first character out of the shift register 2712 to the output recorder 204, the shift register 2712 is clocked by a signal $\overline{ATC+REV3}$. This signal is generated on FIG. 8 by a gate 2926 supplied with the inverted signal REV3 and a signal ATC. Since the shift register 2712 is loaded during the third revolution of the drum 202 in a three revolution cycle, i.e., the inverted signal REV 3 controls the enabling of the gate 2924 supplying the inverted signal CROP1, the output of the gate 2926 is held at a more positive potential during the third revolution. However, during the first and second revolutions of the drum, the signal ATC is applied to the gate 2926 at the clock rate of the output recorder timing signals TT1-TT7, and the gate 2926 provides the negative-going signal $\overline{ATC+REV3}$. This signal is forwarded through the gate 2708 to enable the gate 2710 at the output bit clock rate and clocks the bits stored in the register 2712 to one input of a gate 2718. One input to the gate 2718 is normally held at a more positive potential by a flip-flop 2715, and the third input to the gate 2718 is supplied with the inverted signal TT0. Thus, the gate 2714 provides a more positive output during the first bit interval defined by the signal TT0 which is effective through the gate 2720 to provide an initial space signal to the printer 204. During the next seven output character bit timing intervals defined by the signals TT1-TT7, the first seven bits of the character are shifted out of the register 2712 through the gate 2718 and 2720 to the output printer 204. This occurs during the first and second revolutions of the three revolution cycle of the drum 202. If the bit is a mark, the Q output terminal of the shift register 2712 provides a more positive signal that completes the enabling of the gate 2718 to apply a more negative input to the gate 2720. This results in a more positive output signal representing a mark on the signaling line to the printer 204. During the intervals defined by the timing signals TT8-TT10, the clock logic circuit developes an inverted signal TTMK which holds the output of the gate 2720 in a marking or high level condition. This provides the stop code during the intervals defined by the signals TT9 and TT10 and inserts an arbitrary parity bit in the interval defined by the signal TT8. Since, however, the output recorder 204 does not require a parity bit, the accuracy of the message transmission is not impaired.

This transfer of data to the output printer 204 takes place during the first and second revolutions of the drum in the three revolution cycle. At the beginning of the third revolution, the setting of the counter 2800 is again transferred to the counter 2810 which is advanced to the position occupied by the second character of the message. This second character is now read out of the drum 202 to the shift register 2712 using the drum timing provided by the signal PHASE B. During the following first and second revolutions of the drum 202, the second character is shifted out of the register 2712 to the output printer 204. This cycle is repeated to transfer all of the characters of the message from the drum to the recorder 204.

If, during the transfer of data from the drum 202 to the printer 204, a character supplied to the shift register 2712 does not satisfy an even bit parity check, a code repre-senting a question mark is transmitted to the recoder 204 in place of the character in the shift register 2712. Mors specifically the flip-flop 2715 provides a parity check. This flip-flop is cleared so that the $\overline{Q}$ terminal provides a more positive output potential to enable the output gate 2718 by an inverted signal REV2 during each second revolution. The clock terminal T of the flip-flop 2715 is connected to the output of the gate 2704 and receives a positive-going clock pulse for each bit shifted into the register 2712 during a character. The gate 2704 is enabled by the flip-flop 2700 and an inverted signal DINH1 and is supplied with the incoming data signal DATA and the timing signal PHASE B.

If at the end of the reception of a character by the register 2712, an odd number of bits has been received, the Q terminal of the flip-flop 2714 provides a more positive output potential, and the $\overline{Q}$ terminal of this flip-flop provides a more negative potential which inhibits the gate 2718 to prevent transmission of a character through the gate 2720 to the recorder 204. The other input to the partially enabled gate 2716 is supplied with an inverted signal TT0+7 which controls the gate 2716 to insert the code for a question mark at this point in the message. More specifically, the gate 2716 is normally fully enabled to hold the line to the printer 204 at a high potential representing mark signal except during the timing intervals defined by the signals TT0 and TT7. During these intervals, the gate 2716 is inhibited so that the output line drops to a lower level representing spaces affording the start space and a space in the seventh bit position. The flip-flop 2715 is cleared by the inverted signal REv2.

The flip-flop 2714 provides a null detector which detects the end of the message by the absence of any bits of information in the incoming signal DATA during an interval in which the shift register 2712 has been enabled to receive intelligence. At the end of each block, the inverted signal BS resets a flip-flop 2702 so that a more positive signal is applied to the clear terminal of the flip-flop 2714. The D terminal of this flip-flop receives a more positive potential when the flip-flop 2700 is set to gate a character into the shift register 2712. If a mark bit is received in the incoming signal DATA, the gate 2704 is enabled as described above, and the flip-flop 2702 is set to hold a more negative potential on the C terminal of the flip-flop 2714. This prevents the generation of the reset signal RS. If, however, the flip-flop 2702 is not set during the interval in which it is enabled by the set flip-flop 2700, the next following signal T0·PHASE A is effective through the gate 2618 to clock the flip-flop 2714 to a condition in which a more positive potential is provided at the Q terminal developing the signal RS, which setting would not have been possible if the C terminal of the flip-flop 2714 is held negative by the flip-flop 2702. Generation of the reset signal RS clears the circuit 200 to indicate that the complete message has been transferred from the drum 202 to the output recorder 204.

More specifically, the signal RS enables one input to a gate 2502, the other input of which is enabled by the signal OP1BK1 derived from the output of the gate 2608 representing the current setting of the character counter. The fully enabled gate 2502 resets the flip-flop 2504 to terminate the signal IST1 and one enabling signal to the full gate 2506 and to also terminate the generation of the signal STAT1 if none of the flip-flops 2530, 2532, and 2534 is set at this time indicating other messages awaiting processing. The inverted signal RS also resets the counter 2800 to its initial setting to permit the selection of the first character in the next message to be processed. The inverted signal RS also resets the flip-flop 2600 so that the counter including the flip-flops 2604 and 2606 can be advanced to select the next block having a message stored therein.

To avoid maintaining the output recorder 204 in an operating condition during intervals in which output printing operations are not required, the circuit 200 includes a circuit for automatically transmitting a control H which shuts off the motor in the printer 204 when the last message in the four drum buffer areas or blocks has been transmitted. More specifically, when the last of the flip-flops 2504, 2530, 2532, and 2534 has been reset, the signal STAT1 is terminated, and a more negative potential is applied to the D terminal of the flip-flop 2740 by the gate 2730. During the next following signal TT0, the flip-flop 2740 is clocked so that a more positive potential appears at its $\overline{Q}$ terminal and a more negative potential appears at its Q terminal. The positive potential at its $\overline{Q}$ terminal partially enables a gate 2750 so that during the fourth character bit timing interval a signal TT4 completes the enabling of the gate 2750 to apply a more negative input to the gate 2720. This supplies a mark to the printer 204 and together with the preceding space signals and the following mark signals provided in the timing intervals TT8-TT10 provided by the inverted signal TTMK provides a complete control H character for stopping the motor in the printer 204.

On the leading edge of the next signal TT0, the flip-flop 2742 is reset so that both inputs to the gate 2752 are now at a more positive potential, and the low output of the gate 2752 holds the output of the gate 2720 at a high level marking condition, the low output from the Q terminal of the reset flip-flop 2742 inhibits the gate 2650 to prevent further generation of mark signals by the signal TT4. On the next signal TT0, the flip-flop 2744 is reset.

The control circuit 200 also includes means by which input data derived from the central processing unit is supplied as the signal DATA for direct recording on the output recorder 204. When demand for this output condition arises, an inverted signal INQ1 is supplied which is effective through the gate 2730 to apply a more positive potential to the D terminal of the input flip-flop 2740. This signal also inhibits the gate 2732 to prevent the setting of the flip-flop 2738 to generate the inverted signal AOE.

The inverted signal INQ1 is effective through an inverter 2733 to partially enable a pair of gates 2734 and 2736. One or the other of these two gates is fully enabled in dependence on whether or not the output recorder 204 has messages waiting in the drum buffer storage track. More specifically, if no messages are awaiting transfer to the printer 204, the gate 2736 is enabled by the inverted signal STAT1 and the output timing signal TT10 to reset the flip-flop 2738 so that a more positive enabling potential is applied to one input of a gate 2746. Alternatively, if messages are stored in the drum buffer track associated with the output printer 204 when the inquiry is received, the gate 2734 is fully enabled whenever the reset signal RS appears at the termination of the output operation then in progress. The enabling of the gate 2734 also resets the flip-flop 2738 to partially enable the gate 2746.

The timing signals TT10 sequentially set the flip-flops 2740, 2742, and 2744 to produce the operations described above. When the flip-flop 2744 is set, the gate 2746 is fully enabled to provide a signal AOE which advises the central processor unit that it is now possible to supply output signals to the printer 204. This is supplied as an inverted input signal DATAX to the gate 2720.

To provide means for detecting an abnormal overrun condition in the counter 2800, a gate 2801 is provided. This gate is fully enabled when the counter 2800 advances beyond the count normally used to select characters from the block on the buffer storage track of the drum 202. When the gate 2801 is fully enabled, the inverted signal DINH1 is generated. This signal is applied as an inhibit to one input of the gate 2704 and thus prevents the setting of the flip-flop 2702. If the flip-flop 2702 is not set, the flip-flop 2714 generates the reset signal RS because it appears that no data bits have been received in the signal DATA during a character readout. Generation of the reset signal RS restores the circuit 200 to a normal condition in the manner described above.

Although the present invention has been described with reference to a single illustrative embodiment thereof, numerous other modifications and embodiments can be devised by those skilled in the art that will fall within the spirit and scope of the principles of this invention.

What is claimed and desired to be secured by Letters Patent of the United States is:

1. A buffer storage apparatus for storing a plurality of variable-length messages and for presenting said messages to a data utilization device, said appartus comprising:

a magnetic storage unit containing a plurality of storage regions each large enough to hold a message of maximum length;

output circuit means for serially retrieving from any region within said magnetic storage unit successive elements of messages and for transferring said retrieved message elements to said data utilization device;

output circuit initialization means connecting to said output circuit means for adjusting said output circuit means to retrieve message elements starting at the beginning of any of said memory regions; and monitoring means supplied with the message elements read out of said magnetic storage unit by said output circuit means for responding to the absence of any message element by actuating said output circuit initialization means to immediately commence the retrieval of data from another message-containing region of said magnetic storage unit;

whereby the amount of time required by said output circuit means to supply a plurality of messages to said data utilization device is minimized in proportion to the brevity of the individual messages.

2. An apparatus in accordance with claim 1 wherein said output circuit means includes means responsive to an initial actuation of said output circuit means for automatically supplying a start signal to said data utilization device and means responsive to the completed retrieval of all messages in said regions for adding a stop signal following the last message element transmitted as part of the last message to said data utilization device, and wherein said data utilization device includes means for placing itself into operation in response to said start signal and means for terminating its operation in response to said stop signal.

3. In a data handling system which utilizes data expressed in codes, an apparatus for generating differing first and second data items expressed in said code, said apparatus comprising:

a shift register having at least two stages;

means for presetting the stages of said shift register in a first manner when said first data item is to be generated;

means for presetting the stages of said shift register in a second, different manner when said second data item is to be generated;

means for advancing data through said shift register following the presetting of the shift register stages; and a logic network having inputs connected to the stages of said shift register and having a single output at which a fluctuating signal appears as data advances through said shift register, said fluctuating signal representing said first or said second data item in accordance with how the stages of said shift register are present;

whereby two distinct data item codes may be generated by a single shift register.

4. An apparatus in accordance with claim 3 wherein said shift register includes at least one data input and data output to each stage, wherein circuit means interconnect the data input and output of successive stages, wherein each stage includes a clock or data advance input, which includes pulse generating means for supplying pulses to the clock or data-advance inputs of all said stages, and wherein means are provided for supplying a signal of one polarity to the first stage data input whenever a first data item code is to be generated and for supplying a signal of another, opposite polarity to the first stage data input whenever a second data item code is to be generated.

5. An apparatus according to claim 3 which further includes:

a data utilization device having a data input;

a source of data which is to be supplied to said data utilization device;

switching means for alternately connecting the input of said data utilization device to the output of said logic network or to said source of data; and means controlling said switching means, said means for presetting, and said means for advancing for causing said first data item code to be transmitted to said utilization device followed by data from said data source followed by said second data item code, whereby data transmitted to said data utilization device from said source is always preceeded by said first code and is always followed by said second data item code.

6. A recorder control circuit comprising a recorder having an input, a storage means having a plurality of addressable storage locations each capable of storing a message having a variable number of characters, location selecting means coupled between the storage means and the input to the recorder for selecting the addressable storage locations and transferring the messages from the storage locations to the recorder, a detecting means monitoring the transfer of messages from the storage means to the recoder and providing a control signal when the absence of a message from a storage location is detected, status storing means for storing indications of the storage locations that contain messages, and means controlled by the control signal and the status storing means and coupled to the location selecting means for controlling the selecting means to select another storage location containing a message.

7. The recorder circuit set forth in claim 6 including a character counter for counting the characters in a message supplied from a storage location to the recorder.

8. The recorder control circuit set forth in claim 7 including means controlled by the character counter for enabling the detecting means to check for the presence of each character in a message.

9. The recorder control circuit set forth in claim 7 including means responsive to said control signal from said detecting means for resetting the character counter to a normal setting.

10. A recorder control circuit comprising a recorder having a recorder input and using start and stop signals, storage means having a plurality of addressable storage locations each adapted to store a message, storage input means for storing messages in different ones of the storage locations, status means for storing an indication of the storage locations in which a message is stored, output control means controlled by the status means and including selector means for selecting locations containing messages to be recorded and for supplying stored messages to the recoder input, and recorder enabling means controlled by the control means and the status means for automatically supplying to the recorder a start signal preceding the first stored message and a stop signal following the last stored message.

11. The recorder control circuit set forth in claim 10 in which the recorder enabling means includes both a plural stage counter circuit operable to set and reset states and logic circuit coupled to the counter circuit to provide one of the start and stop signals when the counter circuit is set and the other of these signals when the counter circuit is reset.

* * * * *